Patented Oct. 21, 1947

2,429,380

UNITED STATES PATENT OFFICE 2,429,380

DEHYDRATION OF CASTOR OIL

William T. Walton, Charles A. Coffey, and Oswald E. Knapp, Chicago, Ill., assignors to The Sherwin-Williams Company, Cleveland, Ohio, a company of Ohio No Drawing. Application April 10, 1944, Serial No. 530,440

7 Claims. (Cl. 260—405.5)

This discovery relates to the dehydration of hydroxylated fatty acid esters. Castor oil is a well known example of this class of compounds but the class includes various other esters which contain a hydroxyl group.

Many different catalysts have been proposed in prior patents and in the chemical literature for effecting the dehydration of such oils or other hydroxylated esters by a chemical reaction involving the removal of water which is caused to form from the hydroxyl group on one carbon atom and a hydrogen atom on an adjacent carbon atom, thereby forming a double bond or linkage between said carbon atoms.

Soluble catalysts, if permitted to remain in the oil, adversely affect the water resistance and acid value of the product. Many catalysts, particularly those of an acid character such as sulfuric acid and some derivatives thereof such as aromatic sulfonic acids, which have been proposed or used, promote side reactions which cause the development of a dark color, and reduce the value and desirable properties of the product.

We have discovered a catalyst, namely beta-naphthol sulfonic acid, which is unique and most satisfactory in that it effects substantially complete dehydration; inhibits side reactions; may be used to dehydrate castor oil heated in an ordinary open kettle, thus rendering unnecessary the use of vacuum installations; may be readily removed from the processed oil by filtration; does not adversely affect water resistance or increase the acid value, and produces a product having a very pale color.

Beta-naphthol sulfonic acid is a hydroxylated aromatic compound which will yield beta-naphthol on hydrolysis. It is well known that hydroxylated aromatic compounds as a class, and specifically beta-naphthol, exert a strong anti-oxidant effect on drying oils and retard drying for extended periods even if present in very small amount. Furthermore, it is well known that when used as dehydration catalysts, aromatic sulfonic acids as a class yield very dark oils. Therefore, our results are contrary to expectation and in marked contrast to those obtained by the use of naphthalene sulfonic acid which effects a lower degree of dehydration and produces side reactions and a dark colored product.

Beta-naphthol sulfonic acid may be added to the oil as the free acid, or the acid may be produced in the oil by the reaction of a salt of the acid and a material which will react therewith to produce the beta-naphthol sulfonic acid in the presence of the oil to be dehydrated.

The quantity of the catalyst substance used should comprise only a minor percent by weight of the oil under treatment and the temperature required is only such as can be readily obtained in an open kettle. For instance, substantially 100% dehydration may be obtained in the range from 190° C. to 260° C. and side reactions are inhibited to such an extent that a color of 6L (Hellige) is readily obtained. The time required will vary with the catalyst employed and may be from 45 minutes to 2 hours.

The following examples illustrate procedures which may be employed in carrying out our improved process, but obviously various other procedures may be employed.

Example 1

Raw castor oil was agitated in an open kettle with 3.0% pulverized 2-naphthol-6-sulfonic acid, and the reaction mass was heated to 190° C. and heating was continued to 290° C. Complete dehydration was obtained in about 1 hour from the time the reaction mass temperature reached 190° C. The reaction mass was allowed to cool to 150° C., at which temperature the catalyst was removed by filtration, giving a clear, pale, 100% dehydrated oil. The decomposition products amounted to 0.92%. This oil is miscible with mineral lubricating oil. It is a good drying oil and may be used as such, or bodied in the customary way and incorporated with the usual ingredients to produce a varnish of superior drying characteristics.

Example 2

The procedure set forth in Example 1 was repeated, except that 3% of pulverized sodium salt of 2-naphthol-6-sulfonic acid and 1.1% of fused sodium bisulfate were used instead of the 3% of pulverized 2-naphthol-6-sulfonic acid, and the time required for complete dehydration of the oil was 45 minutes instead of 1 hour. The results were substantially the same, although the decomposition products were only 0.72%.

Example 3

The procedure of Example 2 was repeated, except that the sodium salt of 2-naphthol-8-sulfonic acid was used instead of the sodium salt of 2-naphthol-6-sulfonic acid. 91.4% dehydration was obtained by heating for 75 minutes and to 284° C. after reaching 190° C. The decomposition products were 0.87% and the color of the product was pale.

From the foregoing it will be seen that the 2-naphthol-6-sulfonic acid is preferable to the 2-naphthol-8-sulfonic acid, where complete dehydration is desired, but the 2-naphthol-8-sulfonic acid is satisfactory where the product is to be used as an addition to mineral lubricating oil or for other purposes where light color is desirable but complete dehydration is not essential.

The results given in the foregoing examples are important and surprising in view of the fact that 1-naphthol-5-sulfonic acid gives negligible dehydrating action; 1-naphthol-4-sulfonic acid gives about 59.2% dehydration, and about 2% of decomposition products; naphthalene sulfonic acid gives 95% dehydration but a very dark color amounting to more than 9 (Hellige), and the sodium salt of 2-naphthol-6-sulfonic acid alone and without the sodium bisulfate gives only relative small dehydration. Camphor-sulfonic acid gives a dark color and less than 50% dehydration. The salt of beta-naphthol sulfonic acid and the bisulfate mentioned in Examples 2 and 3, do not need to be the sodium compounds, as potassium, ammonium or other monovalent radical may be used instead of sodium.

Having thus described our invention, what we claim as new and desire to secure by Letters Patent is:

1. The process of dehydrating castor oil to form a light-colored drying oil, which includes the step of heating the castor oil to a temperature of about 190° C. to 290° C., with at least about 3% of a catalyst selected from the group consisting of 2-naphthol-8-sulfonic acid and 2-naphthol-6-sulfonic acid.

2. The process of dehydrating castor oil to form a light-colored drying oil which includes the step of heating the castor oil to a temperature of about 190° C. to 290° C., with at least about 3% of 2-naphthol-6-sulfonic acid.

3. The process of dehydrating castor oil to form a light-colored drying oil, which includes the step of heating the castor oil to a temperature of about 190° C. to 290° C., with at least 3% of 2-naphthol-8-sulfonic acid.

4. The process of forming a light colored drying oil from castor oil which includes dehydrating the castor oil by heating it to about 290° C., with at least about 3% of 2-naphthol-6-sulfonic acid.

5. The process of forming a light colored drying oil from castor oil which includes adding to the castor oil about 3% of an alkali metal salt of an acid selected from the group consisting of 2-naphthol-6-sulfonic acid and 2-naphthol-8-sulfonic acid, and an acid salt which will react with said alkali metal salt to liberate the corresponding acid of said first mentioned salt, and heating the mixture to a temperature of about 190° C. to 290° C.

6. The process of forming a light colored drying oil from castor oil which includes adding about 3% of an alkali metal salt of an acid selected from the group consisting of 2-naphthol-6-sulfonic acid and 2-naphthol-8-sulfonic acid and sufficient sodium bisulfate to react with said alkali metal salt to liberate the corresponding naphthol sulfonic acid, and heating the mixture to a temperature of about 190° C. to 290° C. for at least 45 minutes.

7. The process of forming a light colored drying oil from castor oil which includes heating the castor oil from about 190° C. to 290° C. in the presence of a catalyst formed in situ from the reaction of an alkali metal salt of a compound selected from the group consisting of 2-naphthol-6-sulfonic acid and 2-naphthol-8-sulfonic acid, and an acid salt.

WILLIAM T. WALTON.
CHARLES A. COFFEY.
OSWALD E. KNAPP.

REFERENCES CITED

The following references are of record in the file of this patent:

UNITED STATES PATENTS

| Number | Name | Date |
|---|---|---|
| 1,892,258 | Ufer | Dec. 27, 1932 |